US006341812B1

United States Patent
Knoll

(10) Patent No.: US 6,341,812 B1
(45) Date of Patent: Jan. 29, 2002

(54) WIND DEFLECTING DEVICE FOR VEHICLES

(76) Inventor: Wayne Knoll, 409 Brewster Ave., Silver Spring, MD (US) 20901

( * ) Notice: Subject to any disclaimer, the term of this patent is extended or adjusted under 35 U.S.C. 154(b) by 0 days.

(21) Appl. No.: 09/362,219

(22) Filed: Jul. 28, 1999

(51) Int. Cl.$^7$ .................................................. B60J 1/00
(52) U.S. Cl. .................... 296/180.1; 296/85; 160/368.1
(58) Field of Search ................................ 296/180.1, 85, 296/24.2; 160/368.1, 351

(56) References Cited

U.S. PATENT DOCUMENTS

| | | | | | |
|---|---|---|---|---|---|
| 1,249,397 | A | * | 12/1917 | Higel | 296/85 |
| 2,559,841 | A | * | 7/1951 | Aspenwall | 296/97.9 |
| 2,573,789 | A | * | 11/1951 | Gale | 296/85 |
| 4,109,957 | A | * | 8/1978 | Polizzi et al. | 296/95.1 |
| 4,767,147 | A | | 8/1988 | Kobayakawa et al. | 296/180.1 |
| 4,850,637 | A | | 7/1989 | Carlino | 296/180.1 |
| 5,024,481 | A | | 6/1991 | Swersky | 296/180.1 |
| 5,195,799 | A | * | 3/1993 | Gotz et al. | 296/180.1 |
| 5,211,718 | A | | 5/1993 | Gotz et al. | 296/180.1 |
| 5,318,337 | A | | 6/1994 | Gotz et al. | 296/180.5 |
| 5,362,119 | A | * | 11/1994 | Rosentratter | 296/97.8 |
| 5,368,356 | A | | 11/1994 | Gotz et al. | 296/180.1 |
| 5,702,150 | A | | 12/1997 | Reuter et al. | 296/180.1 |
| 5,707,099 | A | | 1/1998 | Schrader et al. | 296/180.1 |
| 5,728,632 | A | * | 3/1998 | Sugie | 442/43 |
| 5,738,404 | A | | 4/1998 | Stadler et al. | 296/180.1 |
| 5,746,472 | A | | 5/1998 | Rogers | 296/180.1 |
| 5,791,725 | A | * | 8/1998 | Swersky | 296/180.1 |
| 5,806,816 | A | * | 9/1998 | Hull et al. | 248/205.6 |

FOREIGN PATENT DOCUMENTS

| | | | | |
|---|---|---|---|---|
| DE | 004315201 | * | 2/1994 | 296/180.1 |
| DK | 57211 | * | 1/1922 | 296/84 |
| DK | 29453 | * | 4/1922 | 296/85 |
| DK | 36635 | * | 10/1926 | 296/85 |
| GB | 239988 | * | 9/1925 | 296/85 |
| WO | 94/03342 | * | 2/1994 | 296/180.1 |

* cited by examiner

*Primary Examiner*—Joseph D. Pape
*Assistant Examiner*—Patricia Engle
(74) *Attorney, Agent, or Firm*—Jones, Tullar & Cooper, P.C.

(57) ABSTRACT

A wind deflecting device for use with a convertible automobile or jeep type vehicle with side windows and a front seat and/or a rear seat area. This new design wind deflecting device has cloth plus either vinyl plastic (for a windshield) or see-through netting (for a windscreen) spread in back of both front seats extending horizontally from the left inner car wall to the right inner car wall and vertically from the top edge of side windows to the seat interface of the rear seating area. The completed wind deflector will be universally adjustable for use in any motor vehicle. This simplicity of design, with a reduced number of components, makes this device uniquely simple and cheap to produce while at the same time being completely adjustable for use in any convertible vehicle. The device will deflect wind that comes from the rear of the vehicle when traveling. Because of the unique design of this wind deflecting device, the occupants of the front seat cockpit area will be advantaged that in the winter they may drive their convertible with the top down yet still be quite warm in the cockpit because of the windshield blocking and controlling wind completely away from the front cockpit area. This retains the warm air generated from the car's heater in the cockpit area and not diluted from the cold external air that is blocked and controlled by the proper emplacement of the windshield. The converse is also true for summer drivers when the air temperature is greater external to the cockpit area. The cockpit will be cool because the hot outside air shall be blocked from entering the cockpit even with the top down.

11 Claims, 5 Drawing Sheets

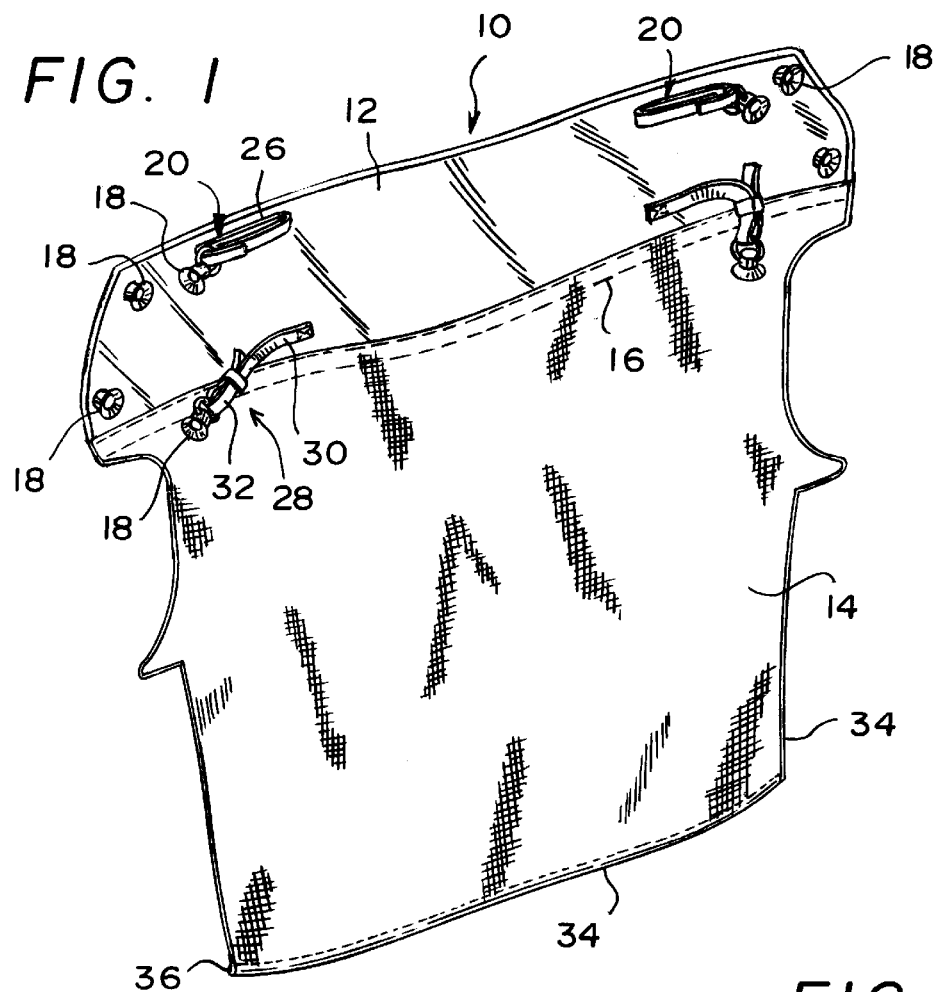
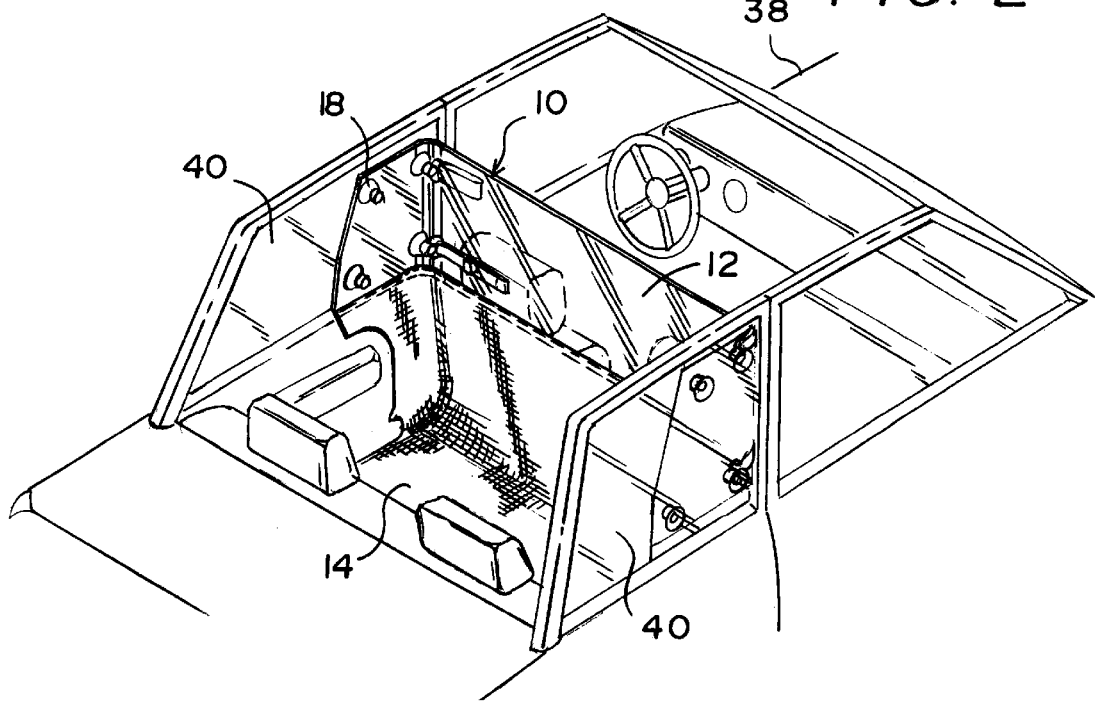

WIND DEFLECTING DEVICE FOR VEHICLES

FIELD OF THE INVENTION

The present invention relates to a wind deflector or windscreen for a motor vehicles, such as a convertible car or an open topped utility vehicle, to deflect wind away from the front part or cockpit that has the occupants.

BACKGROUND OF THE INVENTION

A problem has existed since the onset of convertible cars and open topped road and general purpose vehicles, that vehicles moving forward through air create a motion of air, the direction of which, flows up and over the front glass windshield bypassing the front seat area, thus producing a low air-pressure zone in the front cockpit area. This causes a reverse air flow that goes from the back seat area forward to the front seat area. The forceful reverse air flow can have a multitude of negative effects, namely: disturbing hair styles, chilling drafts on cool days, hot drafts on hot days, disturbing loose articles that could unsafely fly around, irritating downdrafts, noisy air swirls. The use of convertible windshields/deflectors/screens is known in the prior art. More specifically convertible windshields devised and utilized for the purpose of precluding air flow from entering a convertible vehicle are known to consist basically of expected and obvious structural configurations. Windshields in the prior art centralize on specialty shapes that fit only certain car models and use uniquely shaped designs along with struts and braces. As demonstrated by U.S. Pat. No. 5,738,404 for a Porsche Boxster and U.S. Pat. No. 5,318,337 for a Mercedes vehicle. Also, the prior art describes vehicles that need roll bars for windscreen attachments, to secure the netting in place, or the roll bar is needed to inter-space a solid plastic wind-deflector; U.S. Pat. No. 5,702,150 discloses a windscreen attached to the roll-over bar having a shape which fits the contour of the bar. U.S. Pat. No. 5,707,099 discloses a windscreen attached to a roll-over bar. Various attempts have been proposed for adjustable windshields which relay on rigid bars pressing against soft delicate car interiors with clips or rods. They have complicated assembly and storage requirements. U.S. Pat. No. 5,024,481 discloses a windshield for a convertible fastened in the rear seat space by a tension bar extending across the rear seat area. In this respect, the windshield according to the present invention substantially departs from the conventional concepts and designs of the prior art and in so doing provides an apparatus primarily developed for the purpose of deflecting unwanted air flow normally directed to a front cockpit area of a convertible. Therefore, it can be appreciated that there exists a continuing need for an improved and universal wind deflector which can be used in all open topped vehicles. In this regard the present invention fulfills this need. The prior art uses metal, plastics or similar hard materials with difficult screw or clamp emplacement schemes that are designed for use in only that car model. The time intensive emplacement and multitude of parts make the prior art too expensive, costly and car specific for practicality. The prior art also does not address universality, varying distances between seats varying head rest sizes, shapes, positions are not accounted for, nor is occlusion of wind on all four sides of front seating area (top, bottom and both sides) that allows the temperature of the front seat area to be adjusted drastically from the ambient air.

SUMMARY OF THE INVENTION

In view of the foregoing disadvantages inherent in the known types of convertible wind deflectors in the prior art, the present invention has as an object the provision of an improved deflector which has all the advantages of the prior art and none of the disadvantages.

To attain this object the present invention essentially comprises a wind defector for a motor vehicle, such as a convertible or open topped vehicle with a front cockpit area, and a rear seating area. The wind deflector design concept has essentially either one clear window (shield) or see-through netting portion (screen), or one non-transparent moderate to heavy cloth (either total air occluding or percentage thereof) portion, or both of these, and as many as six suction cups or affixing magnets. The wind deflector is affixed to the car via at least the side windows, or the side windows and the back seat. In one embodiment, the optically clear vinyl plastic or see-through netting portion is affixed to the cloth portion completing the total wind blocking/screening surface area. This cloth and vinyl plastic is spread in back of both front seats extending horizontally from left inner car wall to right inner car wall and vertically from the tops of both side windows (affixed to either front or rear side windows) to the seat interface of the rear seating area. The cloth and window portions have a universally generic shape that fits all vehicles. This entails enlarged cloth sides to trap air at the seat-side wall interface. The exact cloth to car size is not necessary because any excess cloth is either tucked in (at the rear seat interfaces) or helps make an added air-seal of folded cloth (at the car side-wall interface). The completed wind deflector will be universally adjustable for use in any motor vehicle by way of adjustable attachment to the suction cups on the side windows and by tucking in excess cloth into the seats. The number of bilateral straps and suction cups or magnetic securing means may vary from two to many, however six total suction cups is preferred. One suction cup at the top of both side windows, then two suction cups at bilateral furthest distal ends of the plastic windshield or netting windscreen. In the case of the windshield these four total suction cups, seal both ends of the plastic vinyl to the side windows thereby occluding wind from slipping between the cracks. The suction cups may be placed on the inside or outside. Magnets may be used as well for securing, and in that case one is placed on both sides of the glass. The highest most suction cup is the only one that has a strap/adjustable securing device, this allows for varying widths of cars.

Cloth tie downs may be used. If used they go from the wind defector to underneath each corresponding front seat and attach by use of a simple hooking mechanism. This holds the windshield in an appropriate attitude and security against wind and other buffeting. One embodiment adds an adjustable strap for tightening of these tie downs, the suction cups alone are strong enough to hold the whole device in place, the added force of the reverse wind fastens the wind deflector against the back of the front seats further securing the wind defector in place.

Each and all seats have a buttocks cushion portion, and a vertically orientated spine resting portion, (either bucket or bench). Rear seats have a crease in-between these buttocks and spine resting portions. This crease runs around the whole periphery of the inside area of the back seat. There is a piping that runs around the edge of the cloth wind defector portion. This piping edge goes into this creased interface. The interior rear cockpit of the car defines the sides and rear of the wind deflector. This wind defector edge is thus simply tucked into this crevasse such that the device fits, snug and taught. This has the advantage of being universally adjustable, elegant contoured to the rear seat, self sealing against wind intrusion. This elegant design blocks the wind from entering the sides and underbelly of the front seats, all with one quick tuck. Since the rear seat portion is made of a heavy cloth fabric that is not light penetrable, this can protect the rear seats of the car from environmental damage, if the car has leather seats this is a great advantage.

This design is also cosmetically pleasing to the eye and is in keeping with the natural forms and contours of a car. This makes this design more appealing to customers. All components are of soft foldable/rollable materials, unlike other designs, this invention can be easily and tightly folded or rolled and placed in a protective bag and stored within the car. This makes this design very portable and hence more apt to be used.

BRIEF DESCRIPTION OF THE DRAWINGS

Seven figures have been selected to illustrate a preferred embodiment of the present invention. These are:

FIG. 1 which shows in perspective plan view the embodiment including an assembled wind deflector or windscreen using a plastic vinyl (windshield) or side window attaching portion together with a cloth portion;

FIG. 2 shows a rear view of the basic windshield or window attaching portion secured with suction cups as employed in its proper position in an open topped vehicle and the cloth portion tucked-in;

DESCRIPTION OF THE PREFERRED EMBODIMENT

Figure 3:
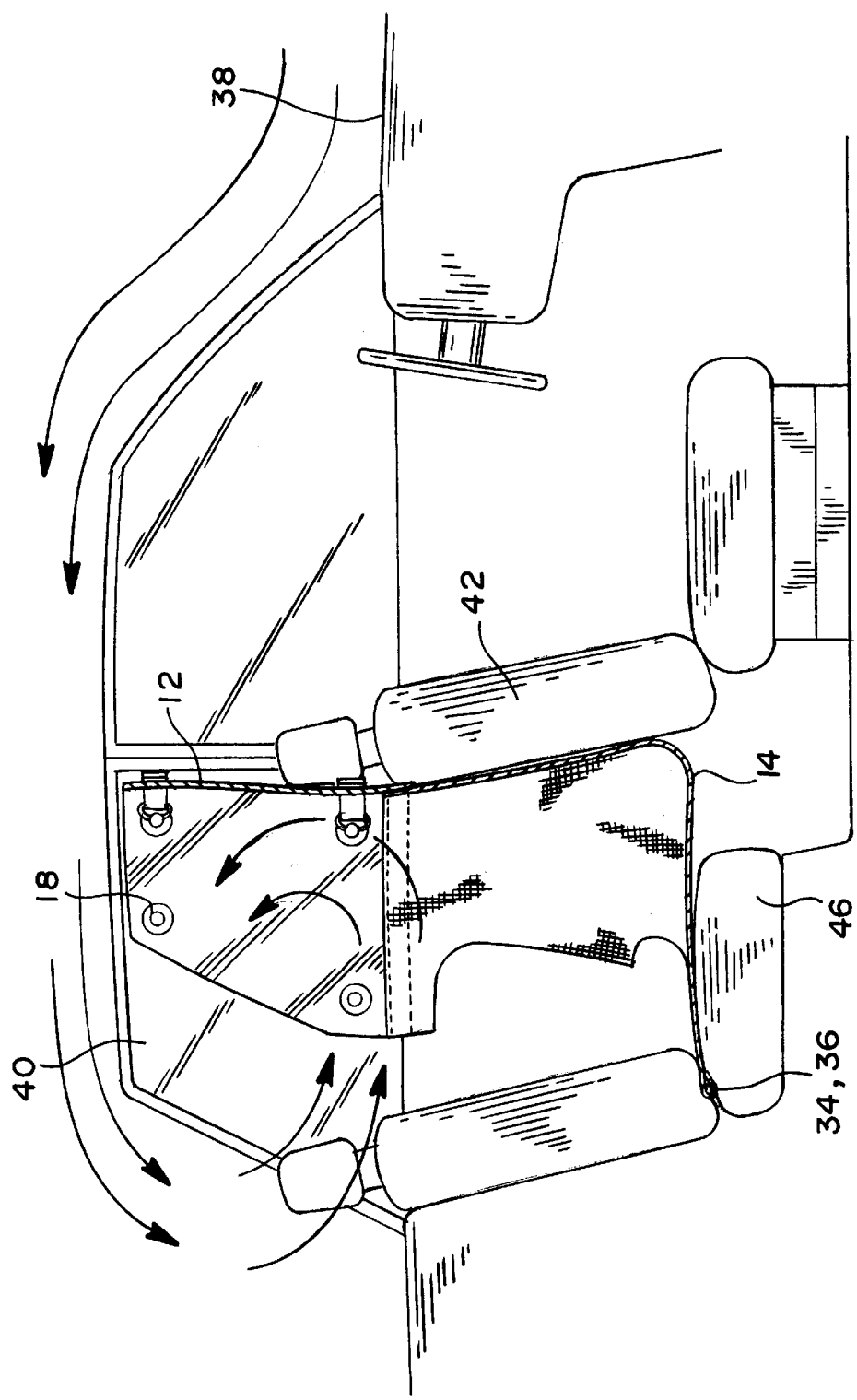
FIG. 3 is a side view showing steering wheel, front and back seats, side windows with suction cups holding the windshield in place. Also shown is the path of wind flow over the vehicle.

The basic wind deflecting device or windscreen 10 has, preferably, a clear plastic portion 12 having side window attaching portion, or a cloth portion 14, or a clear plastic portion 12 with side window attaching portion and cloth portion 14. The side window attaching portions may be clear plastic or netting used alone or to which is sewn at 16 the cloth portion 14 which is generally as wide as the clear plastic portion 12. The windscreen 10 when assembled as shown in FIG. 2 (with portions 12 and 14 together) blocks the flow of wind from entering the front cockpit area via the space between the sides of the seat and the doors. In the embodiment shown in FIG. 1, suction cups 18 are provided on the clear plastic portion 12, and some of these have an adjustable securing device assembly 20 that tightens and adjusts thereby allowing the windscreen to fit snugly to reduce flapping caused by high winds. The suction cups 18 have a metal ring 22 that loops through the suction cup and then in turn is attached to the adjustable securing device 20 (i.e. buckle, hook and mesh, strap). Note that the pull of force through the suction cups onto the clear plastic vinyl of the portion 12 is in a straight line. In this embodiment the suction cup 18 with metal rings 22 are mounted by engaging a hook and mesh arrangement 24 of a strap 26, this allows the greatest possibility of adjustment. This suction cup and fastener mechanism is duplicated bilaterally. The suction cups 18 may also be mounted by the securing device assembly 28 that includes a strap portion 30 secured to the clear plastic portion 12 by, for example, an adhesive, similar to the strap 26. Adjustment is made by an adjusting loop 32. It should be noted that the number of suction cups is arbitrary.

The bottom of the cloth portion 14 is folded around itself and sewn to form a piping 34 including a cord 36 along its length. FIG. 2 shows the windscreen 10 mounted in a vehicle 38 with the cloth portion 14.

As shown in FIG. 3, the optically clear plastic vinyl portion 12 is secured via the suction cups 18 to the rear side windows 40 at two places, and extends generally parallel to the backrest 42 of the front seats. The plastic vinyl portion 12 then descends posteriorly to the front seats and descends to the crease created by the junction of the backrest 44 of the rear seat and the bottom rest 46 of the rear seat and held wedged in by the thickness of the internalized cording 36 of the cloth 14.

Figure 4:
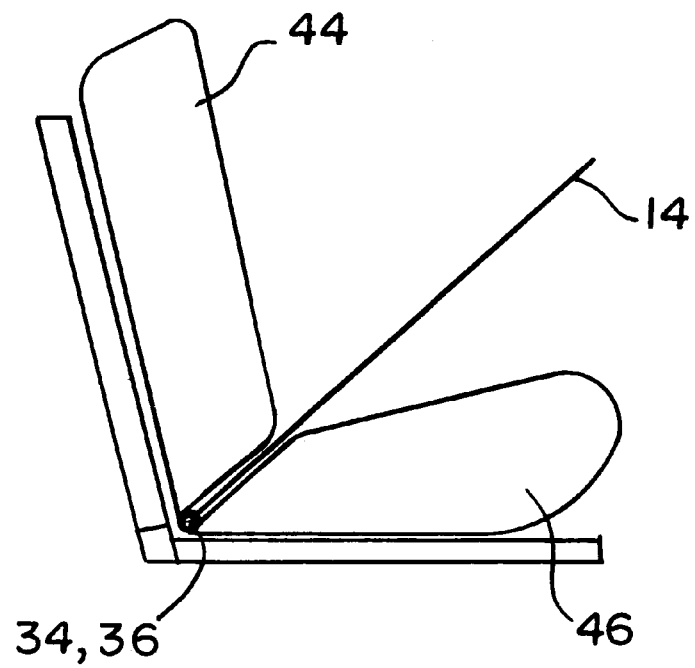
FIG. 4 is a side view enlargement of the cloth windshield "tuck in" portion as it is employed between the backrest seat and the bottom seat.

An enlargement of the tail end of the cloth portion 14 includes an edge which has the piping 34 and cording 36. This piping and cording facilitates firm placement as the cloth portion 14 descends transversely and is wedged into and between seat portions 44 and 46. FIG. 4 shows the edge with piping 34 and cording 36 extending directly back to the crease created by the rear seat as opposed to proceeding first down as shown in FIGS. 2 and 3.

Figure 5:
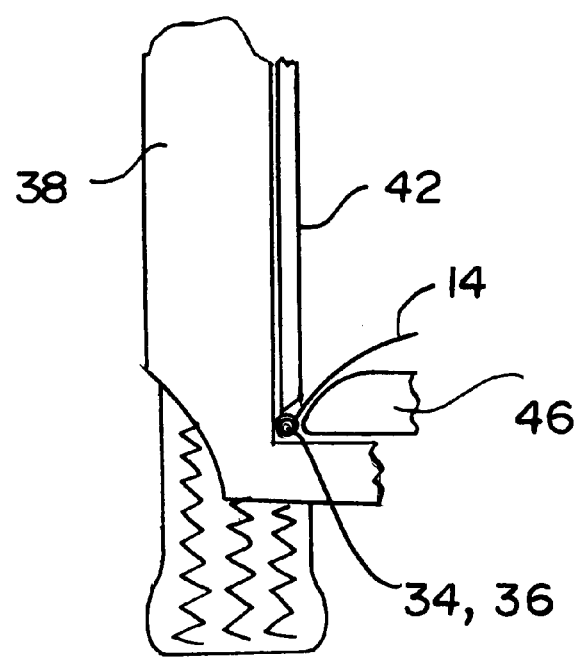
FIG. 5 is a frontal view enlargement of the cloth "tuck in" side edges as employed between the car's interior side walls and the bottom rear seat.

FIG. 5 shows the same principle as applied to the lateral portion of the cloth portion 14, with piping 34 and cording 36 as it is wedged between the interior side body panel 42 of the rear seat area and the bottom rest 46 of the rear seat.

Figure 6:
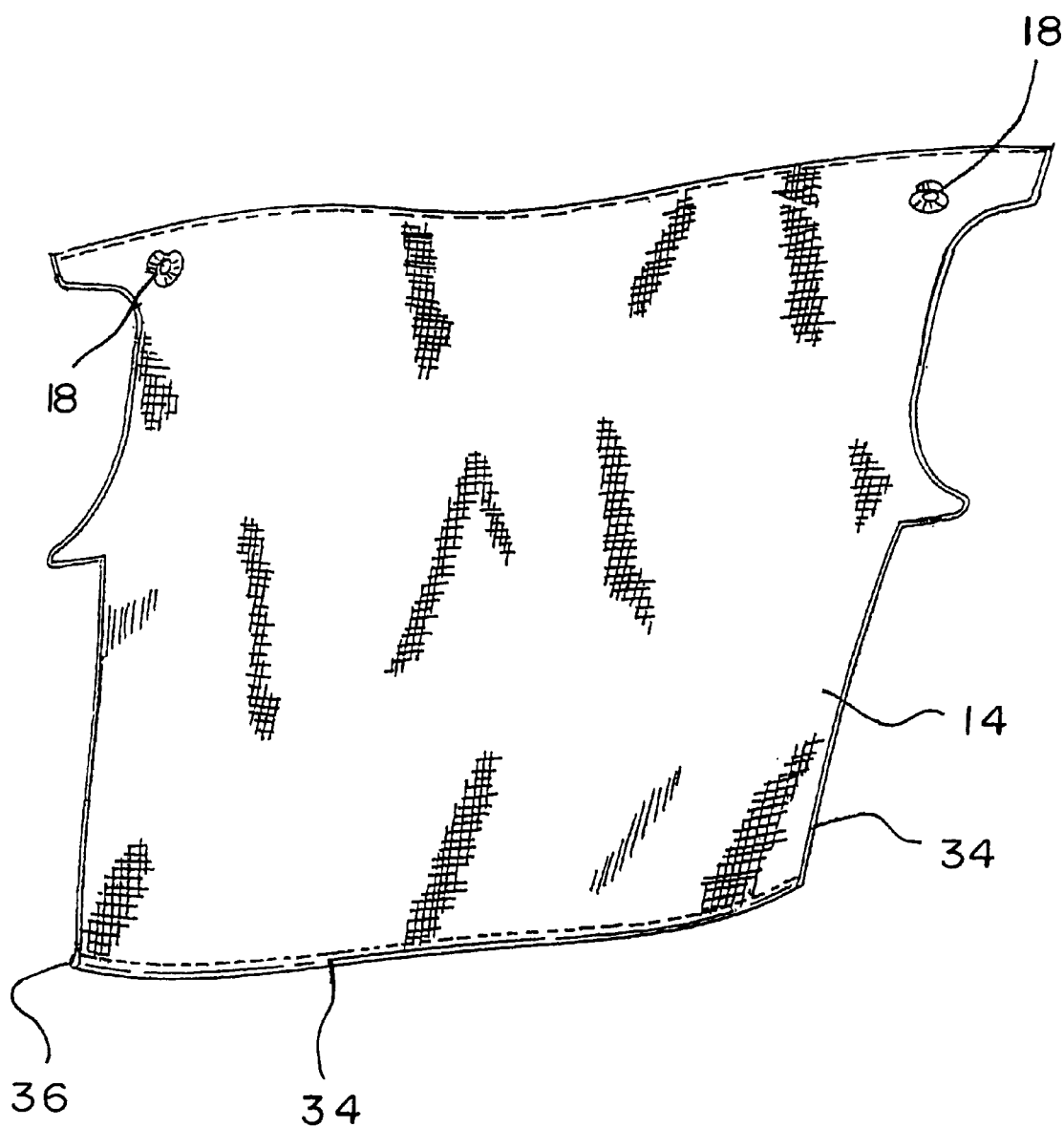
FIG. 6 shows that embodiment whereby a cloth portion only is used.

FIG. 6 shows that embodiment where the side window attaching portion comprises the cloth 14 to which suction cups 18 are mounted for attaching the cloth 14 to the side windows of the vehicle. The cording 36 is used in the same way as in the previous embodiment.

Figure 7:
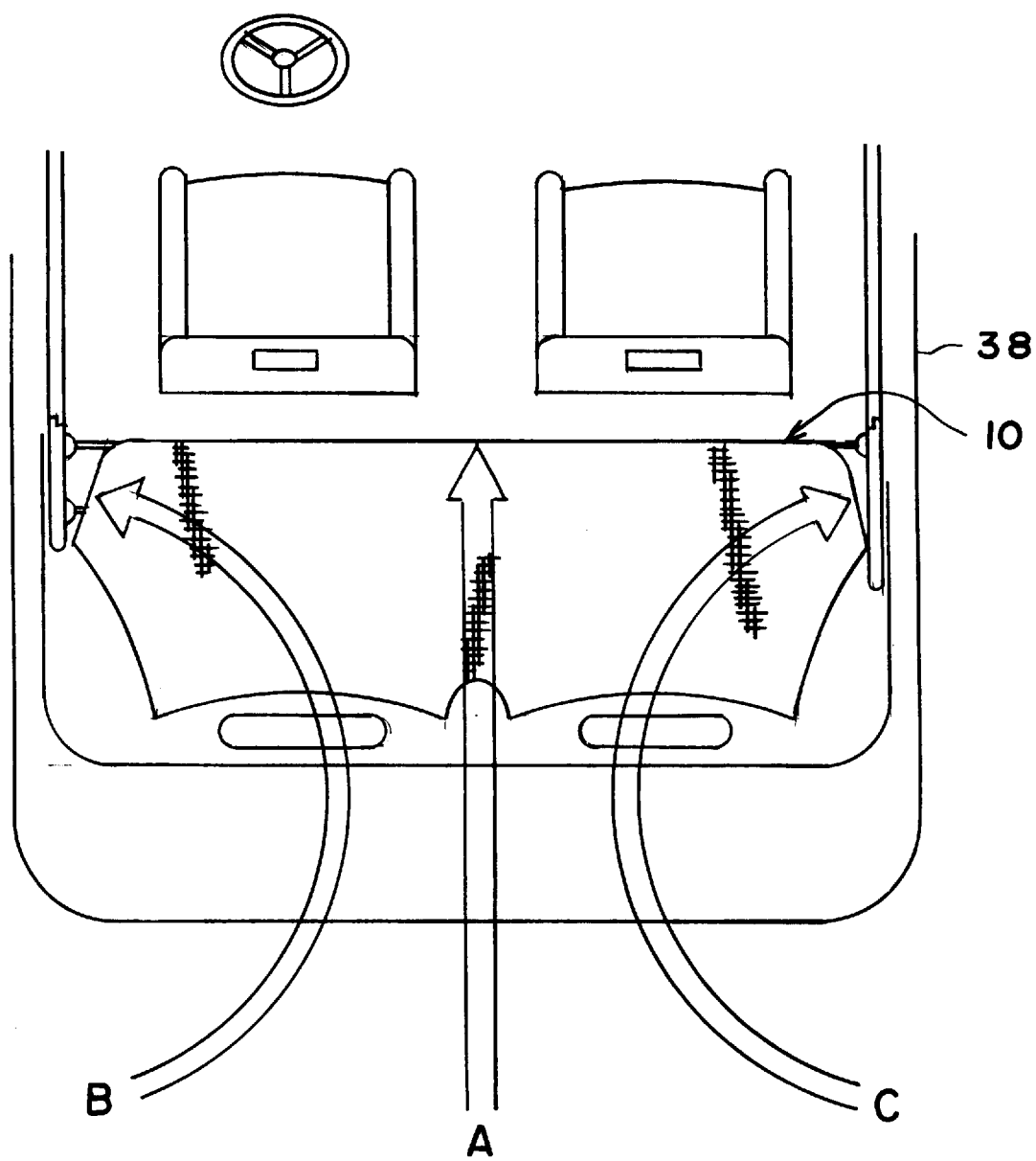
FIG. 7 is a view showing the position and emplacement of the plastic window behind the front seats and cloth portions around the interior edges of the back seating area of a vehicle also shown is the windshield's excess plastic portion being self sealed to the side window by wind pressure.

FIG. 7 shows the emplacement of the wind deflector 10 as it sits behind two front seats. Also shown is how the wind direction A, B and C secures the windshields position in sealing the plastic edges against the side rear car windows, blocking any wind from entering the front cockpit area. In all embodiments, the parts 12 and 14, however configured, are capable of being folded and rolled for storage when not in use.

What is claimed is:

1. A wind deflecting device for an open top motor vehicle, the open top motor vehicle having a forward cockpit region, side windows and rear seats, comprising:

a pair of side window attaching clear view portions;

a cloth portion attached to said pair of side window attaching clear view portions;

means attached to each of said side window attaching clear view portions for mounting each of said side window attaching clear view portions to a respective side window of the open top motor vehicle, said means attached to each of said side window attaching clear view portions comprise suction devices; and means attached to said cloth portion for securing said cloth portion to the rear seats of the open top motor vehicle, such that the wind deflecting device when mounted to the open top motor vehicle blocks wind flow into the forward cockpit region of the open top motor vehicle.

2. The wind deflecting device as defined in claim 1, wherein each of said side window attaching clear view portions is plastic, and said means attached to said side window attaching clear view portion comprises at least two suction devices.

3. The wind deflecting device as defined in claim 2, wherein said at least two suction devices each include a cup and strap portion for adjusting the location of said associated cup with respect to said side window attaching clear view plastic portion.

4. The wind deflecting device as defined in claim 1, wherein said cloth portion is attached to each of said side window attaching clear view portions by sewing.

5. The wind deflecting device as defined in claim 1, wherein the width of each of said side window attaching clear view portions and the width of said cloth portion are substantially the same.

6. The wind deflecting device as defined in claim 1, wherein said means attached to said cloth portion for securing said cloth portion to the rear seats of the open top vehicle comprises piping formed by the cloth itself and a cord held in said piping.

7. The wind deflecting device as defined in claim 6, wherein said piping and associated cord extend along the entire edge of said cloth portion.

8. The wind deflecting device as defined in claim 1, wherein each of said side window attaching clear view portions is plastic, and wherein said means attached to said cloth portion for securing said cloth portion to the rear seats of the open top motor vehicle comprises piping formed by the cloth itself and a cord held in said piping.

9. The wind deflecting device as defined in claim 8, wherein said suction devices include a cup and strap portion for adjusting the location of said associated cup with respect to said side window attaching clear view plastic portion.

10. The wind deflecting device as defined in claim 8, wherein said piping and associated cord extend along the entire edge of said cloth portion.

11. The wind deflecting device as defined in claim 1, wherein said side window attaching clear view portions and said cloth portion are foldable/rollable.

* * * * *